United States Patent [19]
Retzer et al.

[11] Patent Number: 5,757,859
[45] Date of Patent: May 26, 1998

[54] APPARATUS AND METHOD FOR RECOVERING PACKET DATA WITH UNKNOWN DELAYS AND ERROR TRANSIENTS

[75] Inventors: Michael Herbert Retzer, Palatine; Andrew Scott Lundholm, Hoffman Estates, both of Ill.

[73] Assignee: Motorola Inc., Schaumburg, Ill.

[21] Appl. No.: 607,670

[22] Filed: Feb. 27, 1996

[51] Int. Cl.$^6$ ............................................. H04B 1/10
[52] U.S. Cl. ....................... 375/346; 327/310; 455/296
[58] Field of Search ............................... 345/316, 326, 345/317, 346; 327/310; 455/296

[56] References Cited

U.S. PATENT DOCUMENTS 3,846,710  11/1974  Chapman ............................. 375/318

Primary Examiner—T. Ghebretinsae
Attorney, Agent, or Firm—J. Ray Wood

[57] ABSTRACT

An apparatus and method for recovering packet data with unknown delays and error transients is disclosed that includes a received waveform containing a desired information signal relative to a fixed reference, for eliminating an undesired error in the received waveform where the error is localized in time relative to the received waveform to a transient interval, and recovering the desired information signal. Included also is a sampler, responsive to the received waveform, providing a series of time samples representative of the received waveform. A buffer, responsive to the time samples, for providing a plurality of representations of the received waveform at different instants of time, where the length of time is an appreciable duration of a transient interval. A reference slicker, responsive to the plurality of representations, for providing an estimate of a fixed reference. A signal recovery circuit, for comparing the plurality of representations with the estimate of the fixed reference, for purposes of recovering the desired information.

7 Claims, 3 Drawing Sheets

APPARATUS AND METHOD FOR RECOVERING PACKET DATA WITH UNKNOWN DELAYS AND ERROR TRANSIENTS

FIELD OF THE INVENTION

This invention deals with data signal demodulation and more specifically but not limited to adaptively eliminating error transients in a radio frequency received data signal.

BACKGROUND OF THE INVENTION

The need for efficient, low cost, data communications continues to increase, not only in the traditional applications of cabled or microwave high speed telecommunications and local or wide area computer networks, but in the emerging applications of personal communications of data or digitized voice from handheld wireless devices. These wireless devices employ a variety of techniques and technologies to implement data communications, including but not limited to, radio and infrared. These media, as compared with traditional wired data systems, offer increased challenges to the designer, principally because of relatively narrow available information bandwidths and additive systematic or random errors. Furthermore, these personal data systems will often, but not necessarily, be packet implementations, where the media is time shared between a number of devices each sending relatively short bursts of data. In packet data systems there are design tradeoffs between the overhead carried in each packet for synchronization, the amount of actual information carried in each packet, and the reliability of receiving the information without error. The invention described here offers a way to improve the reliability of correctly receiving the transmitted data given systematic transient errors introduced into the data waveform.

In data communications systems with limited information bandwidth it is well known that some sort of Non-Return to Zero (NRZ) modulation scheme offers the optimum steady state performance throughput. In these NRZ schemes, or derivative similar schemes, the information is encoded as some offset from known reference levels. This could be, for example, a voltage value that is greater than some reference could represent a data value of 1, and less than some reference could represent a data value of 0. Similarly, the reference could be a nominal value of frequency, with greater frequency values representing a data value of 1, and lesser frequency values representing a data value of 0. Other techniques of data communication similarly exist, where the data information is encoded as the value of some physical property relative to some reference value; this could be voltage or frequency as used in these examples, or alternatively, light intensity, sinusoidal phase angle, or other similar physical measurable property. Furthermore, the notion of encoding data values as physically measurable offsets relative to some reference level, can be extended from the binary examples used here to multi-level schemes requiring a plurality of reference levels. The task of a data receiver in systems such as this is to recover the encoded data information by making a comparison of some physical measurement relative to some reference level. A fundamental difficulty exists with any of these schemes in that a receiver designed to recover the encoded data values must first determine the value of the reference level used to make the comparison. In traditional wired systems, this reference level can often be a fixed unchanging value, which makes the comparison at the receiver an easy task. In many wireless, and some wired, systems, however, the determination of this reference level must be made at the receiver by some sort of averaging over intervals of the received physical values. This determination is necessary because of systematic channel impairments, such as attenuation, carrier frequency offset, error transients, voltage offset, etc., which preclude fixed references. For example, in typical radio frequency implementations, the reference will vary with carrier frequency errors, and furthermore these errors may be different between each unique transmitter/receiver pair, necessitating some rapidly adaptive scheme for reference recovery. Various techniques exist for the rapid estimation of reference level at the data receiver.

Various phenomena at the transmitter or receiver will introduce undesired transients at the beginning of the data waveform, making the process of determining the center of the reference level difficult. Some of these methods include, but are not limited to, transmitter load pull, power ramping delays, and low frequency settling. Load pull is a phenomena whereby the nominal frequency of an RF generator is momentarily deflected from its desired value. Mechanisms causing this deflection can include initial increased current drain from the battery supply, phase discontinuity at the phase-locked-loop phase detector due to changing RF feedback leakage, component heating, or others. Power ramping delays, or slow turn-on of the transmitter, can distort the transmitted waveform at the beginning of the transmission. Any DC offset, or overall average value offset, of the transmitted waveform will also lead to waveform distortion due to insufficient low frequency response. All of these phenomena have in common the characteristic of an initial transient distortion of the data waveform, which settles out over time.

In packet data systems in general, and specifically with the Cellular Digital Packet Data (CDPD) reverse channel (the channel from the mobile unit to the base), it is necessary for a receiver to be able to rapidly recover and decode the data bits in the presence of unknown delays and keyup transients. Generally a long "dotting sequence" is prepended to the transmitted packet in order to allow these undesirable transients to die out. Generally a receiver needs to make an accurate estimate of the reference center slice during this dotting sequence. Lengthening this sequence is undesirable as it decreases overall system throughput. Tightening the specification and reducing the load pull transient at the transmitter becomes prohibitively expensive. Techniques are known which attempt to quickly establish a center slice "on the fly" as the waveform is being received, for example "DC Restoration Amplifier with Automatic Zero Offset Adjustment", Chapman, U.S. Pat. No. 3,846,710. These methods work, but are not adequate as the undesired transient can last as long as 2 mS, completely obscuring the majority of the dotting sequence for example in the case of CDPD.

Clearly a need exists for a method and apparatus that recovers packet data in the presence of error transients.

BRIEF DESCRIPTION OF THE DRAWINGS

The features of the present invention which are believed to be novel are set forth with particularity in the appended claims. However, the invention together with further advantages thereof, may best be understood by reference to the accompanying drawings in which:

DETAILED DESCRIPTION OF A PREFERRED EMBODIMENT

Figure 1:
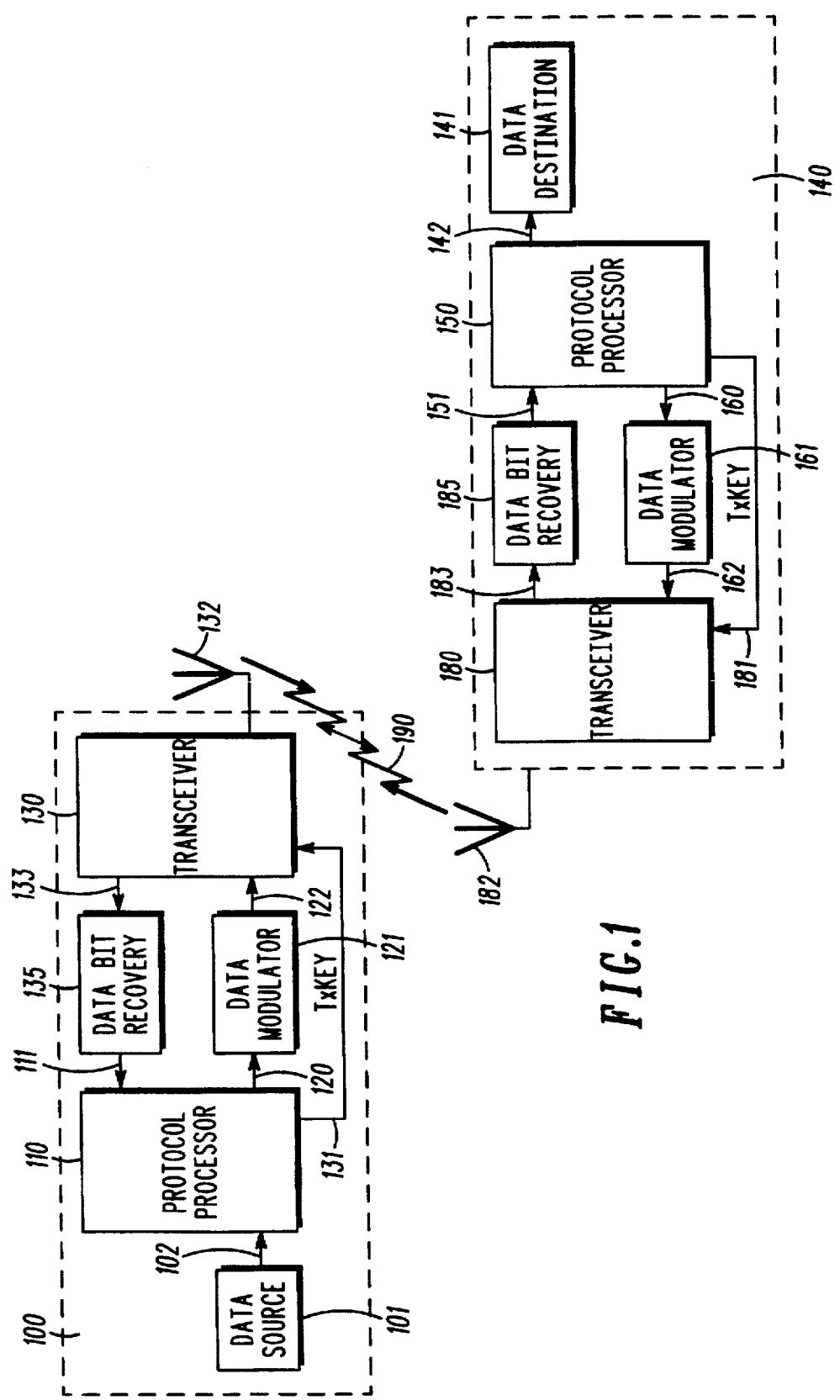
FIG. 1 is a representative diagram of a data communications system operating in accordance with the present invention.

Referring to FIG. 1 a representative diagram of a data communications system is depicted. The system consists of a Sending Terminal (100), a Receiving Terminal (140), and the Media (190), here being depicted as a wireless radio frequency channel, but could in other embodiments consist of an infrared channel or other technology. Each of the Sending Terminal (100) and Receiving Terminal (140) may have the capability of transmitting or receiving data messages over the wireless Media (190), but in the general case the communications may be unidirectional. In this depiction information data will be sent from a Data Source (101) in the Sending Terminal (100) to the Receiving Terminal (140), finally ending up at the Data Destination (141). The Data Source (101) and Data Destination (141) pass their respective information data to and from Protocol Processors (110, 150) over some Information Interfaces (102, 142). It is the function of the Protocol Processors (110, 150) to assure that the information data sent from the Data Source (101) is correctly received at the Data Destination (141). As part of their operation, the Receiving Terminal Protocol Processor (150) may need to detect errors in the received data, and signal the Sending Terminal Protocol Processor (110) that the data has been received correctly or not.

The Protocol Processors (110, 150) handle the formatting of Transmit Link Data Frames (at 120) and Transmit Link Control Frames (at 160) to the Data Modulators (121, 161). The Protocol Processors (110, 150) utilize controllers (131, 181) to control the keying of the Transceivers (130, 180). Data Modulators (121, 161) perform any processing operations on the Transmit Link Data Frames (120) and Transmit Link Control Frames (160) needed to effectively transmit the frames over the Media (190), these processing operations may include but are not limited to bandpass filtering, waveshaping, pre-emphasis filtering, amplitude or angle modulation, etc., which are common methods well known in the art. The output of the Data Modulators (121, 161) are sent over interfaces (122, 162) to Transceivers (130, 180) for transmission over the Media (190). Transceivers (130, 180) handle the actual transmission and reception of the processed frames over the Media (190), using suitable Antennas (132,182). This embodiment depicts a wireless radio frequency Media (190), so the Transceivers (130, 180) and Antennas (132, 182) are suitable for this radio frequency media, but could just as well employ infrared or other technologies suitable to other medias. It should also be appreciated by those skilled in the art that the Data Modulator blocks (121, 161) may reside as blocks separate from the Transceivers (130, 180), with distinct interfaces (122, 162) as shown in this embodiment, or be incorporated internally to the respective Transceivers.

Signals received from the Media (190) using Antennas (182, 132) are processed by Transceiver receivers (180, 130) and sent over interfaces (183, 133) to Data Bit Recovery processors (185, 135). The Data Bit Recovery processors (185, 135) attempt to correctly estimate the received Link Data Frames and Link Control Frames, and pass the estimated received frames over interfaces (151 and 111) to the Protocol Processors (150, 110).

Data flow through this data communications system originates at the Sending Terminal (100) with information data at The Data Source (101). This information data is formatted into Transmit Link Data Frames in Protocol Processor (110), processed in the Data Modulator (121), and transmitted by the Transceiver (130) through Antenna (132) over the Media (190). It is received by the Receiving Terminal (140) through Antenna (182), and is processed by Data Bit Recovery processor (185). The resulting Receive Link Data Frames are processed by Protocol Processor (150), with the received information data passed to the Data Destination (141). In response to Receive Data Link Frames, the Receiving Terminal Protocol Processor (150) will generate Transmit Link Control Frames used as feedback to the Sending Terminal Protocol Processor (110) that the information data has, or has not, been received correctly. These Transmit Link Control Frames are generated by the Receiving Terminal Protocol Processor (150), are processed by Data Modulator (161), and transmitted by Transceiver (180), out Antenna (182), over the Media (190). The Transmit Link Control Frames are received by Antenna (132) coupled to Transceiver (130), are processed by Data Bit Recovery processor (135), and passed to Protocol Processor (110), where they are used to signal success or failure of the information data transfer.

Figure 2:
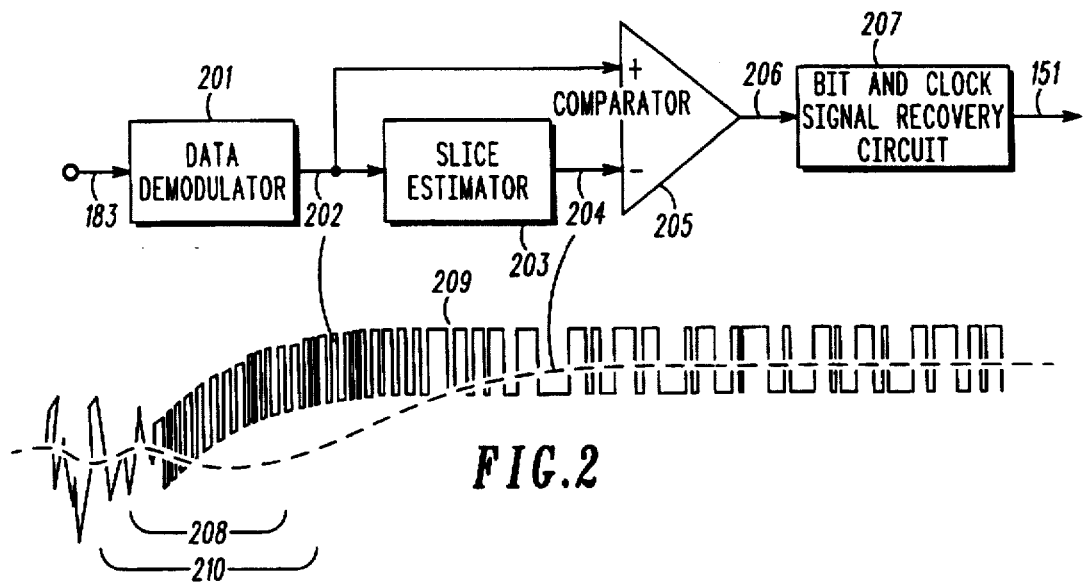
FIG. 2 is a more detailed diagram of a portion of the FIG. 1 system showing the operation of a conventional Data Bit Recovery processor, and illustrating the problems encountered in the bit estimation process when there is a large initial error transient.

FIG. 2 depicts a more detailed description of a conventional implementation of the Receiving Terminal Data Bit Recovery processor (185), included here to clarify the problems in data communications systems addressed by this invention. The received waveform output of the Transceiver (180) feeds into the Data Bit Recovery Processor (185) at interface (183). Some sort of demodulation process will then occur within the Data Demodulator (201). This demodulation process may involve discrimination, envelope detection, coherent carrier tracking, or any other of a number of well known techniques. The result of this demodulation process (at 202) is a representation of the received data bit stream where some physical value, e.g. voltage, varies proportionally to the received bit values. This physical value is used by the Slice Estimator (203) to estimate a Reference level (at 204). Techniques are known for such a reference slice estimator such as "DC Restoration Amplifier with Automatic Zero Offset Adjustment", Chapman, U.S. Pat. No. 3,846,710., which attempt to quickly establish a center slice "on the fly" as the waveform is being received. The varying physical values are then compared against the estimated Reference by the Comparator (205) in order to get the actual level estimate (at 206). The sequence of level estimates are used by Bit Clock Recovery process (207) in order to arrive at the actual received Link Data Frame (at 151).

Depicted also in FIG. 2 is a representation of the receiver demodulated output (at 202), here containing an initial error transient (over interval 208). The output of the Slice Estimator (203 at 204), eventually recovers from this initial transient but only after some averaging delay, causing bit errors at a critical portion of the data waveform (at 209). Critical errors could be eliminated (at 209) by increasing the duration of the non-critical dotting sequence (interval 210), however this increase in non-information overhead reduces the overall efficiency of the communications system.

Figure 3:
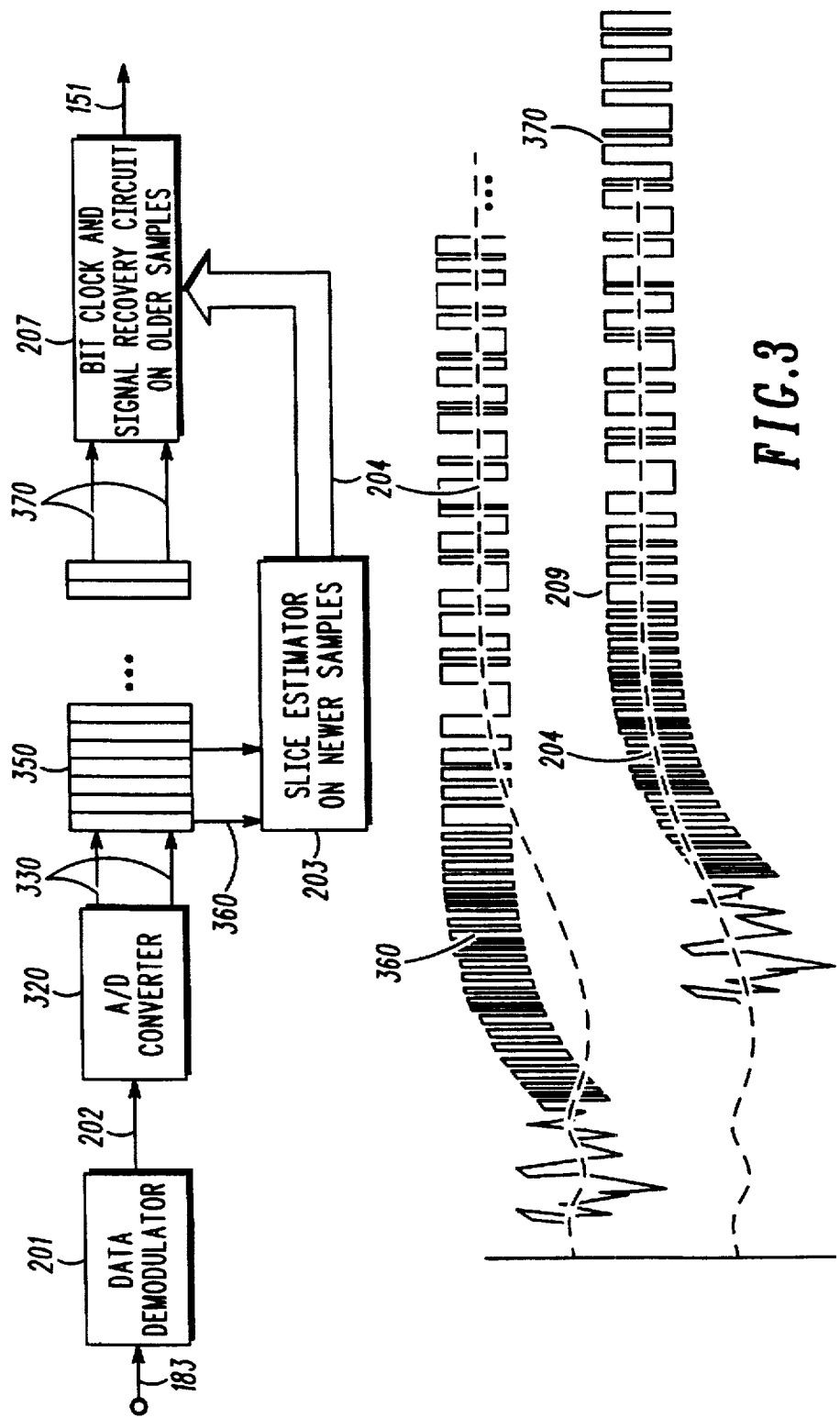
FIG. 3 is a more detailed diagram of a portion of the FIG. 1 system depicted in accordance with a preferred embodiment of the present invention.

The present invention solves the problem of an error transient in the beginning of a data waveform by storing samples of the received waveform in memory, determining an accurate reference slice after all transients have died out, and then processing the beginning portions of the stored samples for bit and clock recovery according to the accurate reference slice. Modern communications equipment implements the low level filtering and bit demodulation operations, including the reference slicing and bit and clock recovery operations, by performing mathematical operations on the stream of digitized samples of the received waveform, (either at baseband, or on two in phase or quadrature channels, or on a digitized intermediate frequency channel). FIG. 3 shows such an embodiment of the Receiving Terminal Data Bit Recovery processor (185) in accordance with the present invention. Here an Analog-to-Digital Converter (320) is employed at the output of The Data Demodulator (201 at 202) to convert the recovered data waveform to a series of samples (at 330). It can be appreciated by one skilled in the art that other embodiments of this invention can employ Analog-to-Digital converter at other points within the Receiving Terminal, namely prior to the Data Demodulator (at 183), or even earlier in the Transceiver (180). For purposes of this invention, it is only necessary to have a sampler to represent the data waveform as a sequence or series of samples. In principle, these samples would not even need to be digitized, but could be stored in analog devices (such as a bucket-brigade charge coupled device).

The sequence or series of samples (330) is stored in a tapped buffer (350), presenting at least a series of newer samples (360), or a first series of samples, and at least a series of older time delayed samples (370), or second series of samples. In the present embodiment, this buffer is implemented using digital logic flip-flops, but in practice could be implemented by conventional computer memory with a sequencing address scheme, analog delay lines, charge coupled devices, or equivalent means. This buffer requires a plurality of outputs (here two are shown at 360 and 370), representing the stored waveform at different instants of time. The newer samples (360) are inputted to the Slice Estimator (203) for determination of the reference slice level (204). The method used for this slice estimate can in principle be the same as that conventionally used (after first performing the inverse Digital-to-Analog conversion), or in practice can be some equivalent operation performed by doing arithmetic operations on the series of samples. The reference slice level (204) performed on these newer samples (360) is now sufficiently settled and stable by the instant of time, or time interval, when the later samples (370) arrive at the bit and clock signal recovery circuitry (207). It is this stable reference slice level (204) used for bit and clock recovery on the delayed series of samples (370). In the example shown here, this more stable reference slice now allows correct data recovery at the critical portions of the data waveform (209).

Figure 4:
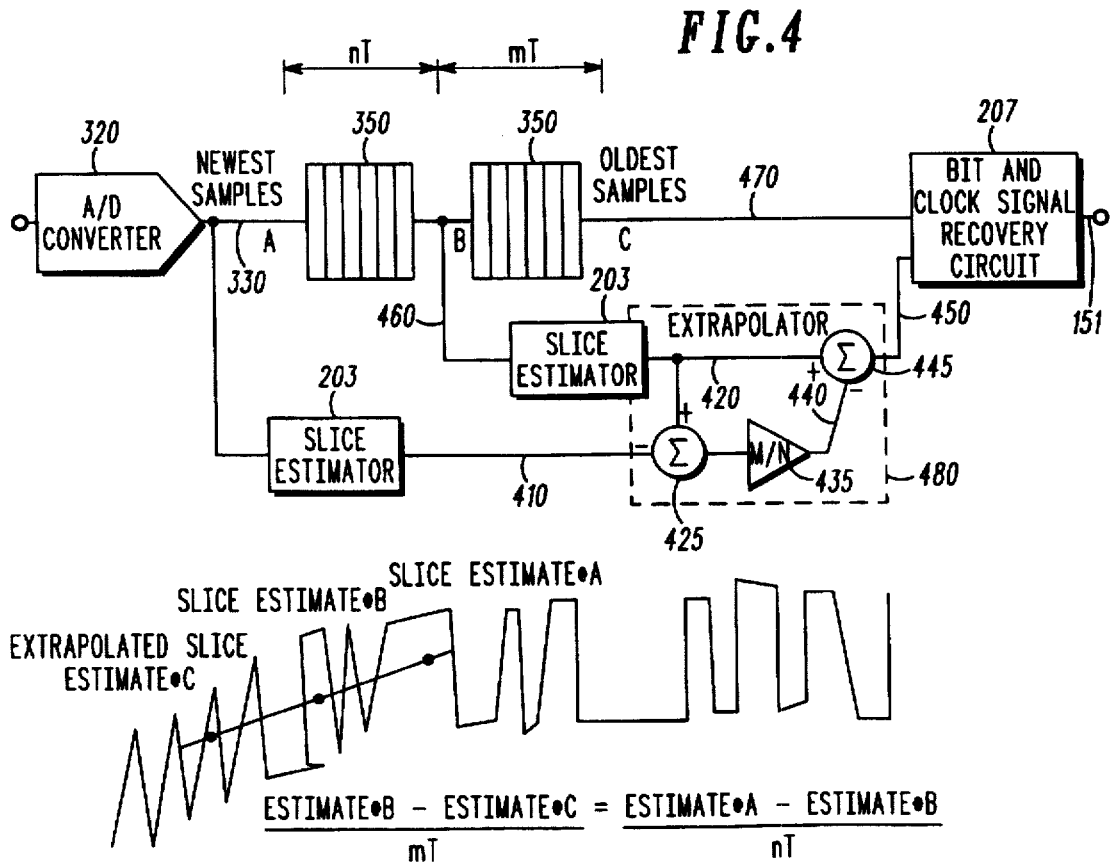
FIG. 4 is an alternative preferred embodiment of the present invention.

Referring now to FIG. 4, an alternative preferred embodiment of the present invention is shown. In accordance with the present invention a sequence of samples taken after an error transient has died out, to better predict the reference level of time delayed samples taken during the error transient, is illustrated by using a plurality of slice estimators taken at different time delay intervals. In the example presented here, the newest data samples (330) are presented to Slice estimator A (203) and the data buffer(350). The newest data samples (330) are used by slice estimator A (203) to generate a center slice estimate (410). Data samples delayed by time nT (460) are used by slice estimator B (203) to generate an estimate (420). Here, a simple straight line extrapolator (480) provides a signal center slice estimate to be used for comparison purposes with the oldest samples C (470) which is much improved over the level, unextrapolated, estimate of FIG. 3 (204). It can be appreciated that the accuracy of such an extrapolated estimate can further be improved by using a greater number of reference estimators at different delay times and/or by fitting an extrapolation curve to the referenced estimators that more nearly models the characteristics of the transient error we wish to remove.

In accordance with the preferred embodiment of the present invention, the differentiating element (425) output (430) is further amplified by a gain block (435) which output (440) a scaled time derivative which is combined/summed in combining element (445) with the output of center slice estimator B (420). The output of the combined value (450) is then used for comparison purposes with the oldest samples C (470) in signal recovery circuit (207) to determine the final data estimate (151). The preferred embodiment described above is represented in the mathematical equation set forth below:

$$\frac{Estimate@B - Estimate@C}{mT} = \frac{Estimate@A - Estimate@B}{nT}$$

It should be appreciated by those skilled in the art that the simple method shown here for reference slice determination on the newer samples could readily be extended to methods using additional outputs of the tapped buffer. These additional outputs could be used to further estimate the shape of the transient error over time, and hence further cancel out the effects of the error at the clock and bit recovery circuitry. These additional outputs may allow for a better estimate of the transient over a shorter period relative to the entire block time, thus allowing for clock and bit recovery to occur even earlier in the transmission.

Independent from the use of multiple taps, if additional independent means are available to the Receiving Terminal for detecting the presence of the start of a received data waveform, the algorithm for determination of the reference slice may be made very expediently and accurately, requiring processing of only a few stored samples at a known good time interval delayed from the start. This independent means for detecting signal presence could be an energy detector, a quieting "squelch" detector, or in some systems rely on a priori knowledge of a reception time window.

It will be apparent to those skilled in the art that the disclosed invention may be modified in numerous ways and may assume many embodiments other than the preferred forms particularly set out and described above. Accordingly, it is intended by the appended claims to cover all modifications of the present invention that fall within the true spirit and scope of the present invention and its equivalents.

What is claimed is:

1. An apparatus comprising:

a received waveform containing a desired information signal relative to a fixed reference, for eliminating an undesired error in said received waveform where said undesired error is localized in time relative to said received waveform to a transient interval, and recovering said desired information signal;

a Sampler, responsive to said received waveform, providing a series of time samples representative of said received waveform;

a Buffer, responsive to said time samples, for providing a plurality of representations of said received waveform at different instants of time where a length of time is an appreciable duration of said transient interval;

a Slice Estimator, responsive to said plurality of representations, for providing an estimate of a fixed reference;

a Bit and Clock Signal Recovery circuit, for comparing said plurality of representations with said estimate of said fixed reference, for purposes of recovering said desired information signal.

2. The apparatus of claim 1, further comprising extrapolating circuitry including:

a differentiating element for providing an estimate of a time derivative of a center slice estimate;

a gain block for operating on said estimate of time derivative to provide a scaled time derivative; and a combining element for operating on said scaled time derivative and said center slice estimate to provide an estimate of a signal center slice.

3. The apparatus of claim 1, wherein said transient interval is a preset interval.

4. A communications apparatus comprising:

a data demodulator;

a sampler, said sampler configured to convert a recovered data waveform into at least a first and a second series of samples representing said recovered data waveform;

a buffer, said buffer for storing at least said first and said second series of samples, said buffer having at least one output representing a stored waveform at a time interval;

a slice estimator, said slice estimator adapted to received said first stored series of samples, said first series of samples configured to provide a reference slice level estimate;

a bit and clock signal recovery circuit for receiving said stored second series of samples and comparing said second stored series of samples with said reference slice level estimate.

5. The apparatus of claim 4, further comprising extrapolating circuitry including:

a differentiating element for providing an estimate of a time derivatives of a center slice estimate;

a gain block for operating on said estimate of said time derivative to provide a scaled time derivative; and a combining element for operating on said scaled time derivative and said center slice estimate to provide an estimate of a signal center slice.

6. A receiving processor comprising:

a data demodulator;

a converter, said converter for converting a received data waveform into at least one series of samples that represent said received data waveform;

said at least one series of samples representing said received data waveform as a first series of samples and as a second series of samples;

a tapped buffer for storing said at least one series of samples, said tapped buffer having at least one output, said at least one output representing said received data waveform at a plurality of time intervals;

a slice estimator, said slice estimator configured to receive said first stored series of samples to provide a reference slice level; and a bit and clock signal recovery circuit, said bit and clock signal recovery circuit configured to receive said second stored series of samples for comparison of said second series of samples with said reference slice level to provide accurate data recovery at a critical portion of said received data waveform.

7. An apparatus comprising:

a sampler;

a time delay providing a plurality of representations at different delay intervals;

a plurality of center slice estimators, each plurality of center slice estimators operating on one of said plurality of representations; and extrapolating circuitry including:

a differentiating element for providing an estimate of a time derivative of a center slice estimate;

a gain block for operating on said estimate of said time derivative to provide a scaled time derivative; and a combining element for operating on said scaled time derivative and said center slice estimate to provide an estimate of a signal center slice.

* * * * *

UNITED STATES PATENT AND TRADEMARK OFFICE
CERTIFICATE OF CORRECTION

PATENT NO : 5,757,859
DATED : May 26, 1998
INVENTOR(S): Retzer et al.

It is certified that error appears in the above-identified patent and that said Letters Patent is hereby corrected as shown below:

```
Please amend the claims as follows

Column 7, line 41, change "derivatives" to
--derivative--.
```

Signed and Sealed this

Twenty-third Day of November, 1999

Attest:

Q. TODD DICKINSON

*Attesting Officer*    *Acting Commissioner of Patents and Trademarks*